United States Patent [19]

Eaton

[11] 3,974,937

[45] Aug. 17, 1976

[54] MONITORY CLOSURE SEALING MECHANISMS FOR STORAGE FACILITIES

[76] Inventor: George H. Eaton, P.O. Box 91294, West Vancouver, British Columbia, Canada

[22] Filed: Oct. 6, 1975

[21] Appl. No.: 620,111

[52] U.S. Cl. .............................................. 220/239
[51] Int. Cl.² ........................................ B65D 53/00
[58] Field of Search .................... 220/232, 239, 240; 138/93; 49/477

[56] References Cited
UNITED STATES PATENTS

| | | | |
|---|---|---|---|
| 3,266,657 | 8/1966 | Stachiw | 220/239 |
| 3,331,526 | 7/1967 | Levenson et al. | 220/239 |
| 3,694,962 | 10/1972 | McDonald et al. | 49/477 |

Primary Examiner—George T. Hall
Attorney, Agent, or Firm—Larson, Taylor and Hinds

[57] ABSTRACT

A seal mechanism for the closure of a storage facility with means for monitoring and indicating any leakage at the seal. The sealing mechanism includes a chamber for containing gas under pressure which presses a seal against a seat on the storage facility so as to prevent leakage both from the gas chamber as well as the storage facility. Gauge means monitors the pressure in the gas chamber, indicating changes of pressure within the chamber to provide a warning of possible leakage at the seal, and, if desired, additional gauge means to indicate leakage within the storage facility that might be dangerous when said facility is opened.

28 Claims, 10 Drawing Figures

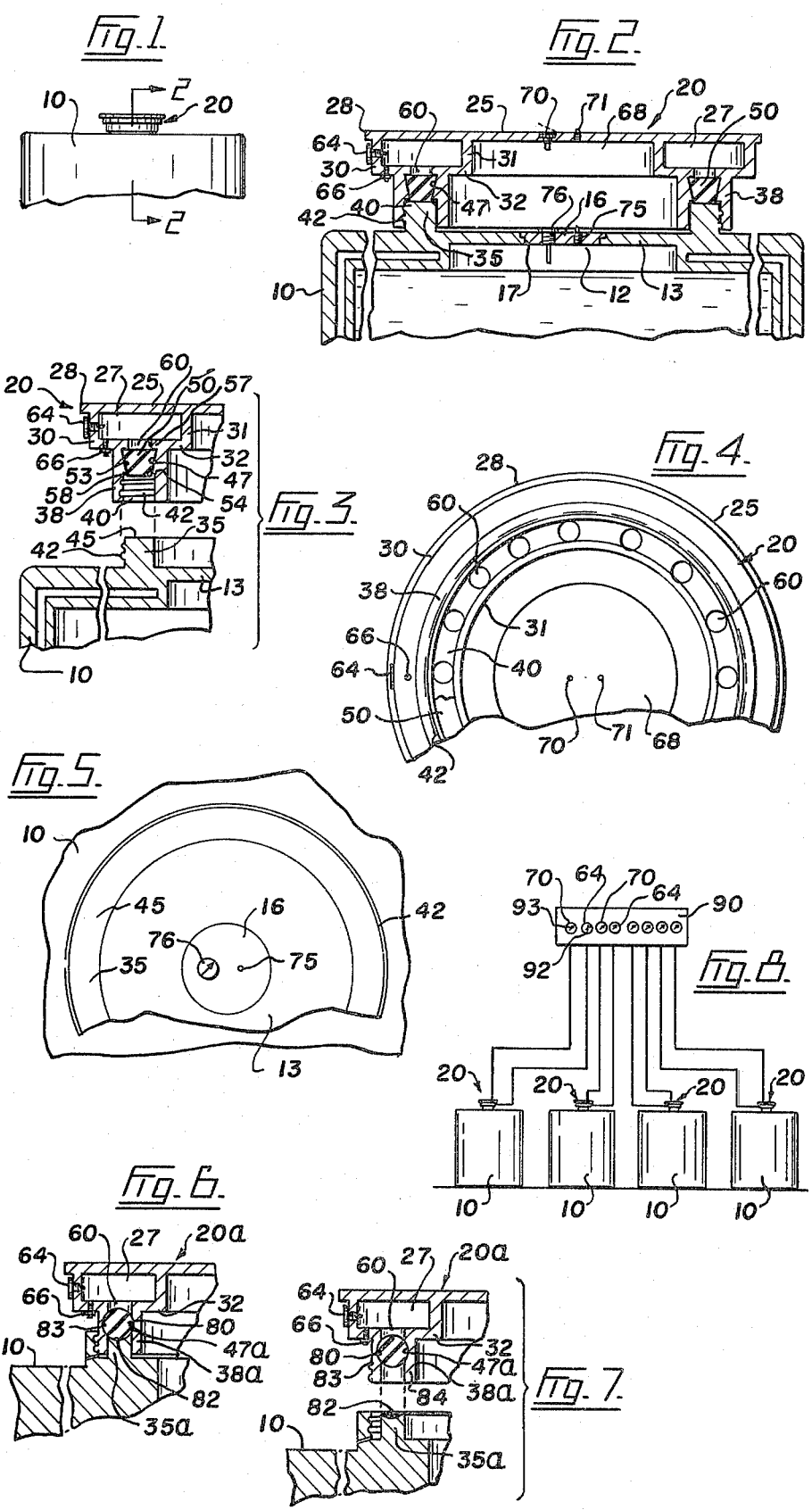

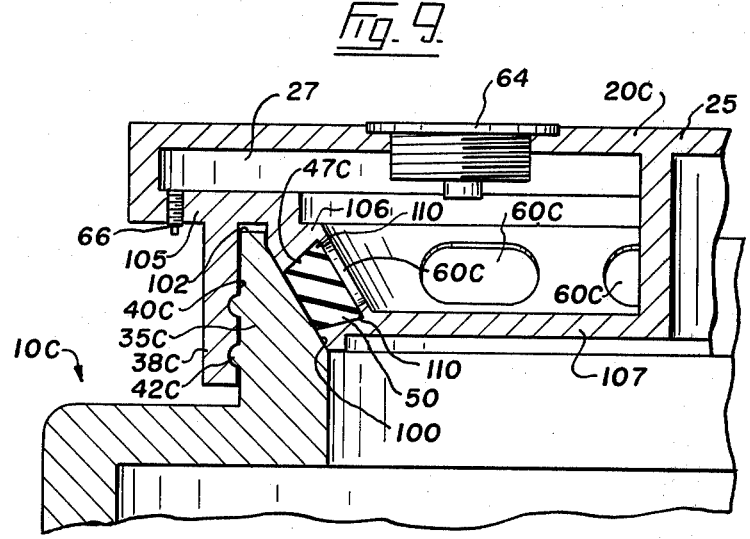
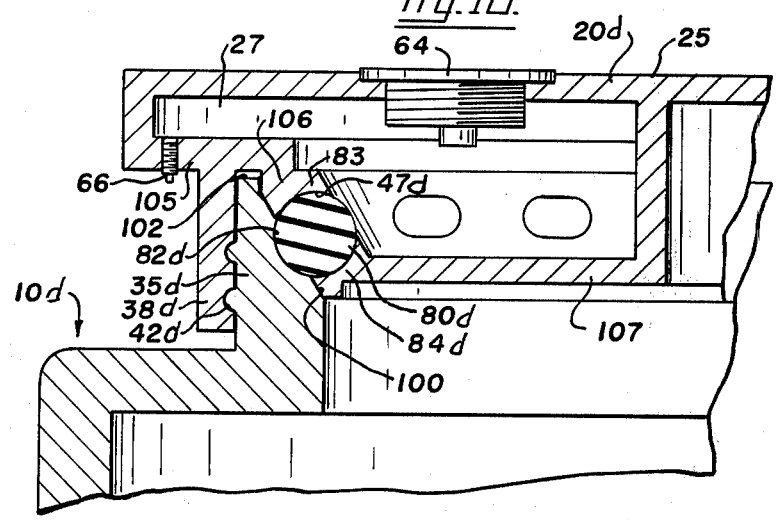

MONITORY CLOSURE SEALING MECHANISMS FOR STORAGE FACILITIES

This invention relates to sealing mechanisms for storage facilities, such as stationary and portable containers, and having monitoring systems to indicate any malfunctioning of the sealing mechanisms, with or without means to indicate possible unsafe conditions within the storage facilities.

The present sealing mechanism can be used with any type of storage facility, and it can be designed particularly for facilities intended for hazardous materials. This invention can be used to prevent leakage of any liquid or gas, but it is primarily intended for dangerous liquids and gases not only to reduce the possibility of leakage of these, but to forwarn of a possibility of leakage and/or of any danger of undesired release of gas or liquid when the storage facility is opened. This sealing mechanism is particularly useful for containers that are used for shipping dangerous materials in confined spaces, such as, for example, in aircraft. Leakage of obnoxious or dangerous fluids from containers carried in aircraft is a great problem to the transportation industry, and although there are stringent regulations regarding containers for this purpose, there still have been leakages that have been very dangerous and even have caused explosions and fires in aircraft. There have been many different forms of containers and seals devised, but leakages still occur. In addition, there usually is no way of knowing that there is a leak until the gas or liquid is seen or smelled, in which case dangerous situations have been created, and it is very difficult to deal with these in the air. There is no way of monitoring or detecting slow leaks or of providing a warning that leakings might occur before acutally starting.

The sealing mechanisms of the present invention can be used with the closures of many different types of storage facilities, such as portable or stationary containers, bins and the like. The storage facilities may hold gases, liquids of solid materials that are liable to give off gas. For the sake of convenience, the invention will be described herein in association with portable containers.

The sealing mechanisms of this invention are practically leak-proof. In any case, these mechanisms are such that one or more containers can be constantly monitored at the containers themselves and/or remotely therefrom. With this arrangement, a forewarning of possible leakage can be given, and leaks can be detected the moment they start. The present system is such that warnings can be automatically given when a leakage possibility arises or a leak starts.

An important feature of this sealing mechanism is the fact that it has the capability of monitoring the effectiveness of the seal thereof. Leakage possibilities and leakages are detected right at the beginning so that they can be dealt with before developing or becoming serious.

The present sealing mechanism utilizes gas pressure to press a sealing ring against seating means around the outlet or portal of a storage facility to prevent leakage from the facility. It includes means for indicating the pressure of the gas being used so that any change in the pressure will indicate leakage from the container at the sealing ring or leakage of the pressure gas. The pressure gas is contained in a chamber which is in communication with the sealing ring, and this chamber is relatively large so that slow leaks from the gas chamber past the sealing ring can go on for a comparatively long time before the effectiveness of the seal mechanism is materially reduced. This is particularly useful if the storage facility is checked only periodically. However, the gas chamber may be provided with gauge means either at the facility or container or remote therefrom which will indicate any change in the pressure within the chamber. If there is an increase in pressure, this would indicate a leakage from the container past the seal into the gas chamber, while a drop in pressure generally indicates leakage from the chamber past the seal. Any pressure drop indicates that the pressure against the sealing ring is weakening, reducing the effectiveness of the seal, and provides a warning of possible leaks from the container.

A sealing mechanism in accordance with this invention is used in association with a storage facility having an inlet opening, a removable closure for this opening, and means to releasable secure the closure to the storage facility, said sealing mechanism comprising a first seat on the storage facility and extending around the storage facility opening, a second seat formed on the container closure of the storage facility and opposed to said first seat and in registry therewith when the closure is positioned to close the inlet opening, a compressible sealing ring to fit against the registering first and second seats, said second seat being contoured to fit over substantial portions of opposite sides of the sealing ring to retain the ring in place, a closed gas chamber in the closure having an outlet opening through the second seat, said outlet opening being closed by the sealing ring, and means to admit gas into the closure chamber, whereby gas under pressure in said chamber presses the sealing ring against the first seat and said sides of the ring against the contoured second seat to prevent leakage from the storage facility through the inlet opening thereof and from the gas chamber.

In the preferred form of the invention, a pressure gauge is connected to the storage facility closure and is in communication with the gas chamber therein to indicate the pressure of the gas in the chamber. This pressure gauge may be such that it can be read at the storage facility and/or through electrical means at a point removed from said facility.

Examples of this invention are illustrated in the accompanying drawings, in which FIG. 1 is a reduced view of one form of storage facility or container including a sealing mechanism in accordance with this invention;

FIG. 2 is an enlarged vertical section through the top of the container and taken on line 2—2 of FIG. 1, and with the closure or cover and sealing mechanism in position;

FIG. 3 is a fragmentary view similar to FIG. 2 with the closure above and in line with the container opening;

FIG. 4 is a plan view of the underside of the closure of this container;

FIG. 5 is a plan view of the container of FIG. 2 with the closure removed;

FIG. 6 is a fragmentary vertical section through an alternative form of sealing mechanism;

FIG. 7 is a view similar to FIG. 6 but with the closure and cover raised above the container;

FIG. 8 diagrammatically illustrates how one or more containers can be monitored and their condition indicated at a station remote therefrom;

FIG. 9 is a fragmentary sectional view illustrating an alternating form of sealing mechanism similar to that of FIGS. 2 and 3; and FIG. 10 is a fragmentary sectional view illustrating another alternative form of sealing mechanism which is similar to the mechanism of FIGS. 6 and 7.

Referring to FIGS. 1 to 5 of the drawings, 10 is a storage facility or container of any desired size, shape or construction. This container has a portal or inlet opening 12 in the top 13 thereof. In this example, the container has a secondary closure or cover 16 adapted to close the opening 12. This cover is removably held in position in any desired manner, and the illustrated cover is provided with threads 17 that engage threads in top 13 around the opening. This cover arrangement is usually provided for containers designed to handle dangerous fluids and/or fluids under high pressures. In some alternatives, cover 16 can be omitted.

A primary closure or cover 20 is provided for container 10 and is removably connected thereto in any desired manner. The illustrated cover 20 is screw-threaded so that it can be rotated into position, in which case the cover is circular in shape. However, the cover can be other than circular in horizontal section, in which case suitable clamping means is provided to retain the cover in position on the container.

In this example, the primary cover 20 consists of a top 25 which has an annular chamber 27 formed on its undersurface adjacent its periphery 28. This chamber is formed by a pair of spaced-apart concentric walls 30 and 31 projecting downwardly from top 25 and joined at their lower edges by a bottom wall 32.

A rim or rib 35 is formed on the top 13 of the container and projects upwardly therefrom. In this example, the rib 35 is annular in shape and extends around and is spaced outwardly from the inlet opening 12 of the container. An annular projection 38 is formed on and projects downwardly from the bottom wall 32 of cover 20 and has an annular channel 40 formed therein and opening downwardly therefrom. The channel is of such size and shape as to fit closely over rib 35 when cover 20 is placed on container 10. In this example, channel 40 and rib 35 are formed with corresponding threads 42 so that the cover can be screwed onto the top of container 10.

Rib 35 is formed with a flat outer surface which forms a first seat 45 facing upwardly in channel 40 when the primary cover is in position. A second seat 47 is formed in channel 40 between the chamber bottom wall 32 and the first seat of rim 35. A compressible sealing ring 50 is shaped to fit along its bottom edge against the first seat 45 and within second seat 47 when the cover is in its closed position. In this example, ring 50 is substantially rectangular in cross section. In actual practice, it is preferable to form this ring with sides that taper inwardly in cross section towards the first seat, as clearly shown in FIGS. 2 and 3. In addition to this, seat 47 is formed with side walls 53 and 54 which are contoured to fit over substantial portions of the opposite sides of the sealing ring to retain the ring in place. As the sides of the sealing ring in this example taper inwardly in a downward direction, the side walls 53 and 54 of seat 47 also taper inwardly in a downward direction. Channel 40 is also formed with shoulders 57 which project transversely into the channel and against which the outer surface of the sealing ring bears.

As side walls 53 and 54 of seat 47 taper inwardly within the channel 40, a pair of shoulders 58 project inwardly at the lower edge of said seat to act as a stop for rim 35 when the cover is screwed into position on the container. Outlet means is formed in the bottom wall 32 of chamber 27 and opens through the second seat 47. The outlet means 60 may be in the form of a slot extending completely around the chamber bottom wall and channel 40, or it may be in the form of a plurality of smaller openings, as shown, arranged annularly to communicate with the channel throughout the length of the latter.

Suitable gauge means is provided for chamber 27. In this example, a gas pressure gauge 64 is provided for this purpose. This gauge is adapted to indicate the gas pressure within chamber 27. A valved gas inlet 66 is provided for chamber 27.

The walls of chamber 27 and the annular projection 38 form a relatively large chamber 68 centrally of cover 20 and over top 13 of container 10. If the secondary cover 16 is omitted, chamber 68 communicates with the interior of container 10. However, if this container is used for particularly dangerous substances, it is preferable to provide the secondary cover 16 in which case chamber 68 becomes a relatively large, closed gas chamber. In this case, a gauge 70 may be provided for indicating the pressure in chamber 68, and a valved inlet 71 is also provided in top 25 for this chamber.

If the fluid in chamber 10 is to be maintained under pressure, cover 16 may be provided with a valved gas inlet 75, and if desired, with a pressure gauge 76.

When it is desired to use container 10, the fluid, either gas or liquid, to be stored or transported is placed in the container. Alternatively, the container may be used for particulate material that may give off gas. If cover 16 is used, it is screwed into position, and if the material in the container is to be kept under pressure, an appropriate inert gas, such as air or nitrogen, may be directed through inlet valve 75 to provide the desired pressure, which is indicated by gauge 76. Then the primary cover 20 with sealing ring 50 in place within the second seat 47, is moved into position with rib 35 projecting into channel 40, after which the cover is screwed into position until the rib abuts shoulders 58, thus making the first and second seats of the sealing mechanism operable. Sealing ring 50 is of such size that when the cover is in its final position, the ring is compressed against first seat 45, shoulders 57 and the side walls 53 and 54 of second seat 47. Then a suitable gas, such as air or carbon dioxide, is directed into chamber 27 through inlet valve 66 to raise the pressure in this chamber to a desired level, which is indicated by gauge 64. This pressure gas presses against ring 50 through the outlet means 60 so that the ring is firmly retained against the two seats. As the ring is substantially wedge-shaped in cross section, the downward pressure on it wedges it against the side walls 53 and 54 of the secondary seat. This arrangement provides an extremely good and efficient seal. If the container is holding gas therein at a pressure above that of chamber 27, any leakage past the sealing ring into chamber 27 will cause the pressure therein to rise. This increased pressure indicated by gauge 64 will provide a warning of the possibility of leakage to atmosphere. On the other hand, if there is a leakage of gas from chamber 27 past the sealing ring, the pressure in chamber 27 will drop and this is indicated by gauge 64. This is an indication of a loss of sealing pressure and therefore of a possible leak from the container. It will be noted that chamber 27 is large relative to the sealing ring so that there can be a slow leak past the ring from the chamber for quite some time before the sealing pressure of the chamber against the sealing ring reduces the effective seal of the container.

Container 10 is particularly useful and safe for the storage of toxic or dangerous gases or substances. If cover 16 is used, as preferred, there is a normally tight gas seal at this point, and a second seal at ring 50, making unnoticed leakage to atmosphere practically impossible. An important feature of this arrangement is that a rise in pressure in chamber 68, indicated by gauge 70, provides a warning that there is a leak from the container into the cover chamber before the gas has any chance to leak to atmosphere, and that suitable precautions must be taken before the cover is removed.

It is possible to omit wall 13, in which case, gas in chamber 68 will maintain the seasling pressure on sealing ring 50. In this case, one of the gauges 64 and 70 can be omitted, and the remaining gauge will indicate any loss of sealing pressure and/or a leakage into chamber 68.

Thus, gauge 64 and/or gauge 70 are constantly monitoring the sealing mechanism so that warning is given in advance of any leakage from the container and/or of any actual leakage.

FIGS. 6 and 7 illustrate an alternative form of sealing mechanism for container 10. The basic difference between this mechanism and the one described above is in the cross-sectional shape of the sealing ring. In this example, a sealing ring 80 of circular cross section is used. Container 10 formed with a rib 35a which has a concave first seat 82 formed on it outer surface. The primary cover 20a of this alternative is formed with the annular projection 38a extending downwardly from the bottom wall 32 of gas chamber 27. The outlet means 60 of chamber 27 opens through second seat 47a which is formed with concave side walls 83 and 84.

The seal mechanism of the alternative of FIGS. 6 and 7 functions in the same manner as the first seal of FIGS. 2 and 3. In this case, the pressure of the gas in chamber 27 presses ring 80 against the concave first seat 82, and this pressure also causes the sides of the ring to press firmly against concave side walls 83 and 84 of the second seat 47a.

FIG. 8 illustrates how a plurality of containers 10 can be kept under surveillance at a remotely located panel 90. The gauges 64 and 70 of the containers are electrically connected to indicator dials 92 and 93 mounted on panel 90. These dials indicate the pressure in the gas chambers 27 and 68 of the covers of the containers. With this arrangement of having continual surveillance, any change in the pressure in any of the container chambers can immediately be seen so that whatever necessary remedial action can be taken. Such precautionary means with respect to shipments of hazardous materials by air cargo freight is extremely vital to the safety of the crew and aircraft.

In the sealing mechanisms described above, the first seats 45 and 82 are facing upwardly, and when the covers 20 and 20a are off, these seats can be damaged if subjected to a heavy blow. This possibility is reduced or eliminated by two alternative forms of the invention illustrated in FIGS. 9 and 10.

Referring first to FIG. 9 which shows a sealing mechanism similar to that of FIGS. 2 and 3, the container 10c is formed with an inwardly inclined first seat 100 on the inside of its rib 35c. This seat is preferably formed on the inner surface of rib 35c and a little below the outer edge or surface 102 of said rib.

In this example, the chamber 27 of cover 20c has a bottom wall which is formed in three sections 105, 106 and 107, section 106 being inclined between sections 105 and 107 to match seat 100. A second seat 47c is formed in the inclined wall section 106 and is shaped to receive ring 50 as in FIGS. 2 and 3. Ring 50 abuts against shoulders 110 in section 106 when said ring is fitted in seat 47c.

Rib 35c of the container fits into a channel 40c formed in cover 20c within the annular projection 38c thereof, the inclined wall section 106 forming a side wall of said channel. Outlet means 60c is formed in wall 106 and opens through second seat 47c, and may be in the form of a slot extending completely around the bottom wall of chamber 27 and channel 40c, or it may be in the form of a plurality of openings, as shown, arranged to communicate with the channel throughout the length thereof. Channel 40c and rib 35c are formed with corresponding threads 42c so that cover 20c can be screwed on to container 10c. In this example, pressure gauge 64 is positioned in the top 25 of the cover.

The sealing mechanism of FIG. 9 operates in the same manner as the previously described sealing mechanisms. As cover 20c is screwed down on to rim 35c of container 10c, sealing ring 50 moves straight down until it engages first seat 100 to provide a tight seal to prevent the escape of gases from the interior of the container and from cover chamber 27.

When cover 20c is off container 10c, the edge 102 of rim 35c faces upwardly and receives any blows to which said rim is subjected. In other words, edge 102 protects seat 100 which faces inwardly of the portal opening 12 of the container where it is not likely to be struck by a falling object. In addition, foreign material cannot rest on seat 100 because of the incline of the latter.

The alternative of FIG. 10 is quite similar to that of FIG. 9, the main difference being that sealing ring 80d is of circular cross section as in the alternative of FIGS. 6 and 7. In that case, the inclined inner surface of rim 35d includes a concave first seat 82d, and the second seat 47d is formed with concave side walls 83d and 84d to fit around the sealing ring.

The sealing mechanism of FIG. 10 functions in the same manner as the sealing mechanism of FIGS. 6 and 7. The other edge 102 of rim 35d protects seat 82d from blows that may be directed towards said seat.

The containers have been shown as portable containers but, as stated above, the container incorporating this invention may be any type of storage facility. It can be a large tank or bin for holding gaseous fluids or for holding solids that are liable to give off gases or for holding fluids and solids that have to be maintained under pressure. The container can be used for liquids so as to reduce any possibility of spillage.

The invention is a precautionary device for containers used for storing and transporting hazardous materials that are poisonous, corrosive, flammable and explosive. The invention not only insures against the pollution of the surrounding environment from spills and leaks of harmful gases, but, also, the environment within the storage facility may be controlled to prevent contamination and/or the dertioration of many materials from bacteria, insect larvae, pests and oxidization by the replacement of air with an appropriate inert gas, such as nitrogen within the container.

I claim:

1. A sealing mechanism for a storage facility having an inlet opening, a removable closure for said opening, and means to releasably secure the closure to the storage facility, said sealing mechanism comprising a first seat on the storage facility and extending around the opening thereof, a second seat formed on the closure of the storage facility and opposed to said first seat and in registry therewith when the closure is positioned to close the inlet opening, a compressible sealing ring to fit against the registering first and second seats, said second seat being contoured to fit over substantial portions of opposite sides of the sealing ring to retain the ring in place, a closed gas chamber in the closure having an outlet opening through the second seat, said outlet opening being closed by the sealing ring, and means to admit gas into the closure chamber, whereby gas under pressure in said chamber presses the sealing ring against the first seat and said sides of the ring against the contoured second seat to prevent leakage from the storage facility through the inlet opening thereof and from the gas chamber.

2. A sealing mechanism as claimed in claim 1 including gauge means connected to the storage facility closure and in communication with the gas chamber therein to indicate the pressure of gas in the chamber.

3. A sealing mechanism as claimed in claim 1 in which said second seat is substantially rectangular in cross section and the sealing ring is correspondingly shaped and fits snugly in the second seat.

4. A sealing mechanism as claimed in claim 3 in which the second seat and the sealing ring taper inwardly in cross section towards the first seat.

5. A sealing mechanism as claimed in claim 1 in which said second seat is substantially circular in cross section and the sealing ring is correspondingly shaped and fits snugly in the second seat.

6. A sealing mechanism as claimed in claim 1 in which said first seat is generally inclined inwardly and towards the inlet opening of the container, and said second seat is inclined on the closure to match the incline of the first seat.

7. A sealing mechanism as claimed in claim 1 including a rib on the storage facility surrounding the opening thereof, said first seat being formed by an outer surface on the rib facing the second seat, and a channel formed on the closure and shaped to fit over said rib with the sealing ring bearing against the first seat, said second seat being formed by side walls of the channel.

8. A sealing mechanism as claimed in claim 1 including a rib on the storage facility surrounding the opening thereof and having a substantially flat outer surface forming said first seat, and a channel formed on the closure and shaped to fit over said rib, said second seat being formed by side walls of the channel shaped and positioned to fit against the sealing ring and to press said ring against the first seat, the pressure gas of the closure chamber pressing the sealing ring against said outer surface and said side walls.

9. A sealing mechanism as claimed in claim 8 in which said side walls extend from shoulders projecting transversely into the channel and towards the first seat and being angled towards each other in the direction of said first seat, said sealing ring being shaped to bear against said shoulders and having side walls against the channel side walls and correspondingly angled therewith.

10. A sealing mechanism as claimed in claim 1 including a rib on the storage facility surrounding the opening thereof and having a concave outer surface forming said first seat, said sealing ring being of circular cross section to fit in the concave first seat, and a channel formed on the closure and shaped to fit over said rib, said second seat being formed by side walls of the channel shaped and positioned to fit against the sealing ring and to press said ring against the first seat, the pressure gas of the closure chamber pressing the sealing ring against said outer surface and said side walls.

11. A sealing mechanism as claimed in claim 10 in which said side walls have concave opposed portions to fit around the sealing ring.

12. A sealing mechanism as claimed in claim 1 including a second removable closure for the storage facility to close said opening within the first mentioned closure, a central chamber formed in the first-mentioned closure over said second closure, and means to admit gas to said central chamber.

13. A sealing mechanism as claimed in claim 12 including gauge means connected to the storage facility closure and in communication with the second chamber therein.

14. A sealing mechanism for a storage facility having an inlet opening, a removable closure to fit over said opening, and means to releasably secure the closure to the storage facility, said seal comprising a first seat on the storage facility and extending around the storage facility opening, a second seat formed in the storage facility closure and opposed to said first seat and in registry therewith when the closure is positioned over the inlet opening, a compressible sealing ring to fit against the registering first and second seats, a closed gas chamber in the closure having an outlet opening through the second seat, said outlet opening being closed by the sealing ring, means to admit gas into the chamber, and gauge means connected to the storage facility closure and in communication with the gas chamber therein, whereby gas under pressure in said chamber presses the sealing ring against the first seat and the second seat to prevent leakage from the storage facility through the inlet opening thereof and from the gas chamber, and said gauge means indicating any pressure change in the chamber to warn of leakage at the sealing ring.

15. A sealing mechanism as claimed in claim 14 in which said second seat is substantially rectangular in cross section and the sealing ring is correspondingly shaped and fits snugly in the second seat.

16. A sealing mechanism as claimed in claim 15 in which the second seat and the sealing ring taper inwardly in cross section towards the first seat.

17. A sealing mechanism as claimed in claim 14 in which said second seat is substantially circular in cross section and the sealing ring is correspondingly shaped and fits snugly in the second seat.

18. A sealing mechanism as claimed in claim 14 including a rib on the storage facility surrounding the opening thereof, said first seat being formed by an outer surface on the rib facing the second seat, and a channel formed on the closure and shaped to fit over said rib with the sealing ring bearing against the first seat, said second seat being formed by side walls of the channel.

19. A sealing mechanism as claimed in claim 14 including a rib on the storage facility surrounding the opening thereof and having a substantially flat outer surface forming said first seat, and a channel formed on the closure and shaped to fit over said rib, said second seat being formed by side walls of the channel shaped and positioned to fit against the sealing ring and to press said ring against the first seat, the pressure gas of the closure chamber pressing the sealing ring against said outer surface and said side walls.

20. A sealing mechanism as claimed in claim 19 in which said side walls extend from shoulders projecting transversely into the channel and towards the first seat and being angled towards each other in the direction of said first seat, said sealing ring being shaped to bear against said shoulders and having side walls against the channel side walls and correspondingly angled therewith.

21. A sealing mechanism as claimed in claim 14 including a rib on the storage facility surrounding the opening thereof and having a concave outer surface forming said first seat, said sealing ring being of circular cross section to fit in the concave first seat, and a channel formed on the closure and shaped to fit over said rib, said second seat being formed by side walls of the channel shaped and positioned to fit against the sealing ring and to press said ring against the first seat, the pressure gas of the closure chamber pressing the sealing ring against said outer surface and said side walls.

22. A sealing mechanism as claimed in claim 21 in which said side walls have concave opposed portions to fit around the sealing ring.

23. A sealing mechanism as claimed in claim 14 including a rib on the storage facility surrounding the opening thereof, said first seat being formed by an inclined surface on the inside of said rib, and a channel formed on the closure shaped to fit over said rib and having an inclined wall opposed to and matching said first seat, said second seat being formed in said inclined wall.

24. A sealing mechanism as claimed in claim 23 in which said second seat is formed with side walls shaped and positioned to fit against the sealing ring and to press said ring against the first seat, the pressure gas of the closure chamber pressing the sealing ring against said first seat and said side walls.

25. A sealing mechanism as claimed in claim 24 in which said side walls extend from shoulders projecting into the seat and towards the first seat and being angled towards each other in the direction of said first seat, said sealing ring being shaped to bear against said shoulders and having side walls against said seat side walls and correspondingly angled therewith.

26. A sealing mechanism as claimed in claim 24 in which said sealing ring is of circular cross section, said first seat is concave in shape, and the side walls of the second seat are curved to fit against the sealing ring and to press said ring against the first seat, the pressure of the gas of the closure chamber pressing the sealing ring against the concave first seat and said side walls of the second seat.

27. A sealing mechanism as claimed in claim 14 including a second removable closure for the storage facility to close said opening within the first mentioned closure, a central chamber formed in the first-mentioned closure over said second closure, and means to admit gas to said central chamber.

28. A sealing mechanism as claimed in claim 27 including gauge means connected to the storage facility closure and in communication with the second chamber therein.

* * * * *